United States Patent
Omari et al.

(10) Patent No.: US 11,199,415 B2
(45) Date of Patent: Dec. 14, 2021

(54) SYSTEMS AND METHODS FOR ESTIMATING VEHICLE POSITION BASED ON CONTEXTUAL SENSOR INFORMATION

(71) Applicant: Lyft, Inc., San Francisco, CA (US)

(72) Inventors: Sammy Omari, Menlo Park, CA (US); Sameer Qureshi, Sunnyvale, CA (US)

(73) Assignee: Lyft, Inc., San Francisco, CA (US)

(*) Notice: Subject to any disclaimer, the term of this patent is extended or adjusted under 35 U.S.C. 154(b) by 272 days.

(21) Appl. No.: 16/364,667

(22) Filed: Mar. 26, 2019

(65) Prior Publication Data
US 2020/0309536 A1    Oct. 1, 2020

(51) Int. Cl.
*G01C 21/32* (2006.01)
*G06K 9/00* (2006.01)
*G06F 16/29* (2019.01)
*G07C 5/00* (2006.01)

(52) U.S. Cl.
CPC ............. *G01C 21/32* (2013.01); *G06F 16/29* (2019.01); *G06K 9/00798* (2013.01); *G06K 9/00825* (2013.01); *G07C 5/008* (2013.01)

(58) Field of Classification Search
CPC ..................................................... G01C 21/32
See application file for complete search history.

(56) References Cited

U.S. PATENT DOCUMENTS

| | | | |
|---|---|---|---|
| 9,058,703 B2* | 6/2015 | Ricci | B60W 50/10 |
| 9,082,239 B2* | 7/2015 | Ricci | G01C 21/26 |
| 9,123,186 B2* | 9/2015 | Ricci | B60K 35/00 |
| 9,147,298 B2* | 9/2015 | Ricci | G06K 9/00268 |
| 9,963,106 B1* | 5/2018 | Ricci | B60R 25/2018 |
| 2020/0098135 A1* | 3/2020 | Ganjineh | G06F 16/583 |
| 2020/0151611 A1* | 5/2020 | McGavran | H04W 4/48 |
| 2020/0159239 A1* | 5/2020 | Li | G05D 1/0088 |
| 2020/0182627 A1* | 6/2020 | Morcom | G01S 17/931 |
| 2020/0198660 A1* | 6/2020 | Bellet | B60K 35/00 |
| 2020/0201344 A1* | 6/2020 | Viswanathan | G05D 1/0088 |
| 2020/0202143 A1* | 6/2020 | Viswanathan | G06K 9/00791 |
| 2020/0232801 A1* | 7/2020 | Kim | G06F 16/29 |
| 2020/0278681 A1* | 9/2020 | Gier | G05D 1/0257 |
| 2020/0284607 A1* | 9/2020 | Mangal | G01S 17/08 |
| 2020/0292331 A1* | 9/2020 | Rabel | G06F 16/2365 |
| 2020/0372264 A1* | 11/2020 | Miyahara | G06K 9/00798 |

* cited by examiner

*Primary Examiner* — Alex C Dunn
(74) *Attorney, Agent, or Firm* — Sheppard Mullin Richter & Hampton LLP

(57) ABSTRACT

Systems, methods, and non-transitory computer-readable media can receive data captured by one or more sensors associated with a vehicle. One or more objects in an environment of the vehicle can be identified based on the data captured by the one or more sensors. A position estimate of the vehicle can be generated within a known map based on one or more positional inferences pertaining to the vehicle, the one or more positional inferences pertaining to the vehicle being determined based on the one or more objects or features identified in the environment of the vehicle.

20 Claims, 9 Drawing Sheets

SYSTEMS AND METHODS FOR ESTIMATING VEHICLE POSITION BASED ON CONTEXTUAL SENSOR INFORMATION

FIELD OF THE INVENTION

The present technology relates to vehicle systems. More particularly, the present technology relates to systems, apparatus, and methods for determining vehicle operation based on sensors.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have sensors that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to receive data captured by one or more sensors on a vehicle. One or more objects or features in an environment of the vehicle can be identified based on the data captured by the one or more sensors. A position estimate of the vehicle can be generated within a known map based on one or more positional inferences pertaining to the vehicle, the one or more positional inferences pertaining to the vehicle being determined based on the one or more objects or features identified in the environment of the vehicle.

In an embodiment, the generating the position estimate for the vehicle within the known map comprises identifying a plurality of lanes based on the known map, and determining that the vehicle may be positioned within a first lane of the plurality of lanes based on the one or more objects or features identified in the environment of the vehicle.

In an embodiment, the one or more objects or features identified in the environment of the vehicle comprise one or more additional vehicles.

In an embodiment, the identifying one or more objects or features in the environment of the vehicle further comprises determining, for each vehicle of the one or more additional vehicles, a direction of travel for the vehicle based on the data captured by the one or more sensors.

In an embodiment, the first lane of the plurality of lanes is identified based on the one or more additional vehicles and the directions of travel for the one or more additional vehicles.

In an embodiment, the one or more objects or features identified in the environment of the vehicle comprise one or more lane markings. The first lane of the plurality of lanes may be identified based on the one or more lane markings.

In an embodiment, the generating the position estimate for the vehicle within the known map comprises: generating a probabilistic map, wherein the probabilistic map comprises a plurality of positions within the known map and, for each position of the plurality of positions, a likelihood value indicative of a likelihood that the vehicle is positioned at that position in the known map.

In an embodiment, the generating the position estimate for the vehicle within the known map comprises: generating a transverse positional estimate for the vehicle based on a first subset of the data captured by the one or more sensors on the vehicle, and generating a longitudinal positional estimate for the vehicle based on a second subset of the data captured by the one or more sensors on the vehicle.

In an embodiment, the known map is a simplified map comprising a subset of information contained in a complex semantic map utilized by a SLAM technique.

In an embodiment, additional sensor data captured by one or more additional vehicles is received. Generating the position estimate for the vehicle within the known map is performed further based on the additional sensor data.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1A:
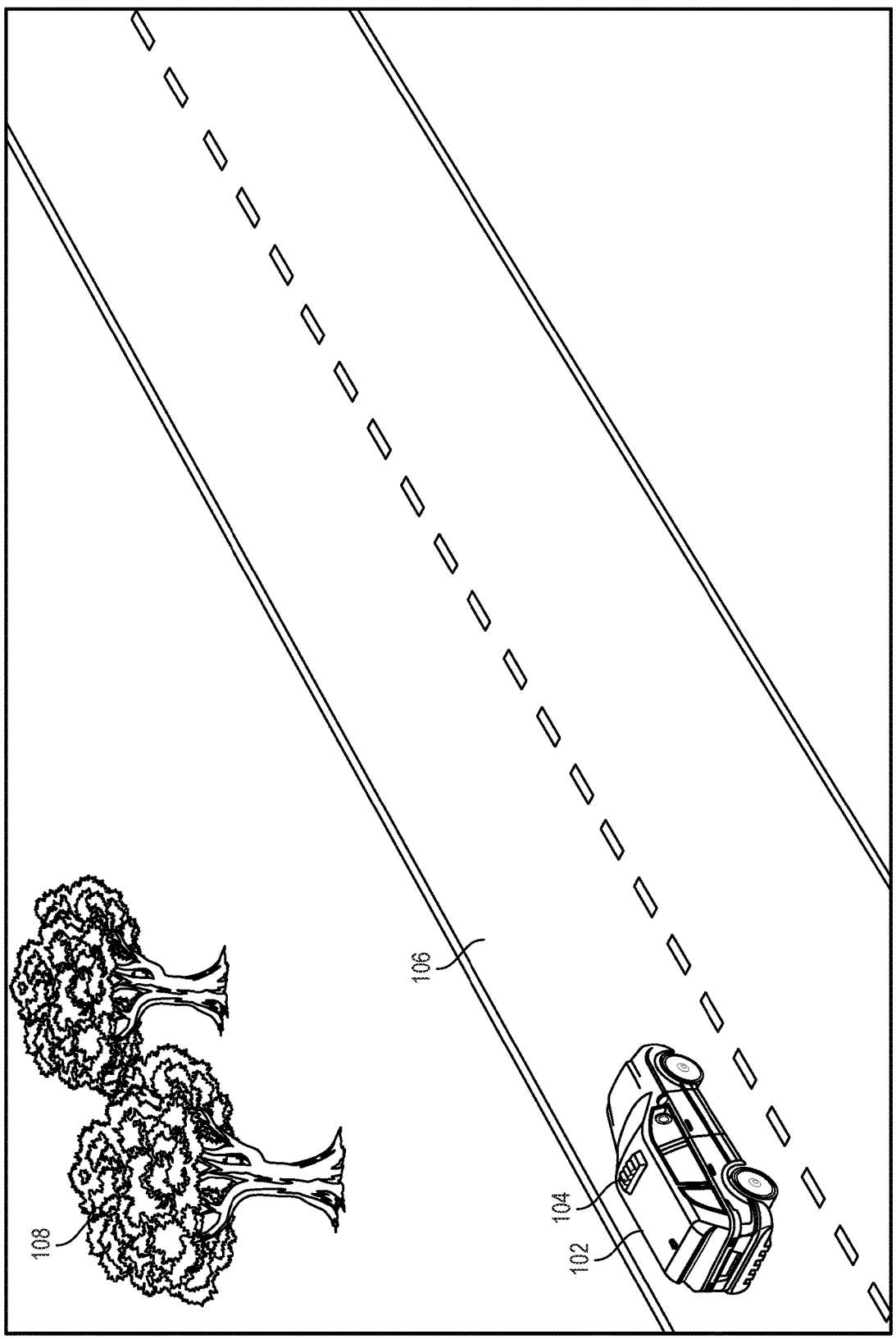
FIGS. 1A-C illustrate an example scenario demonstrating various challenges that may be experienced in conventional approaches to vehicle operation.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have one or more sensors or sensor systems that can recognize hazards, roads, lane markings, traffic signals, etc. Data from sensors may be used to, for example, safely drive the vehicle, activate certain safety features (e.g., automatic braking), and generate alerts about potential hazards.

Figure 1B:
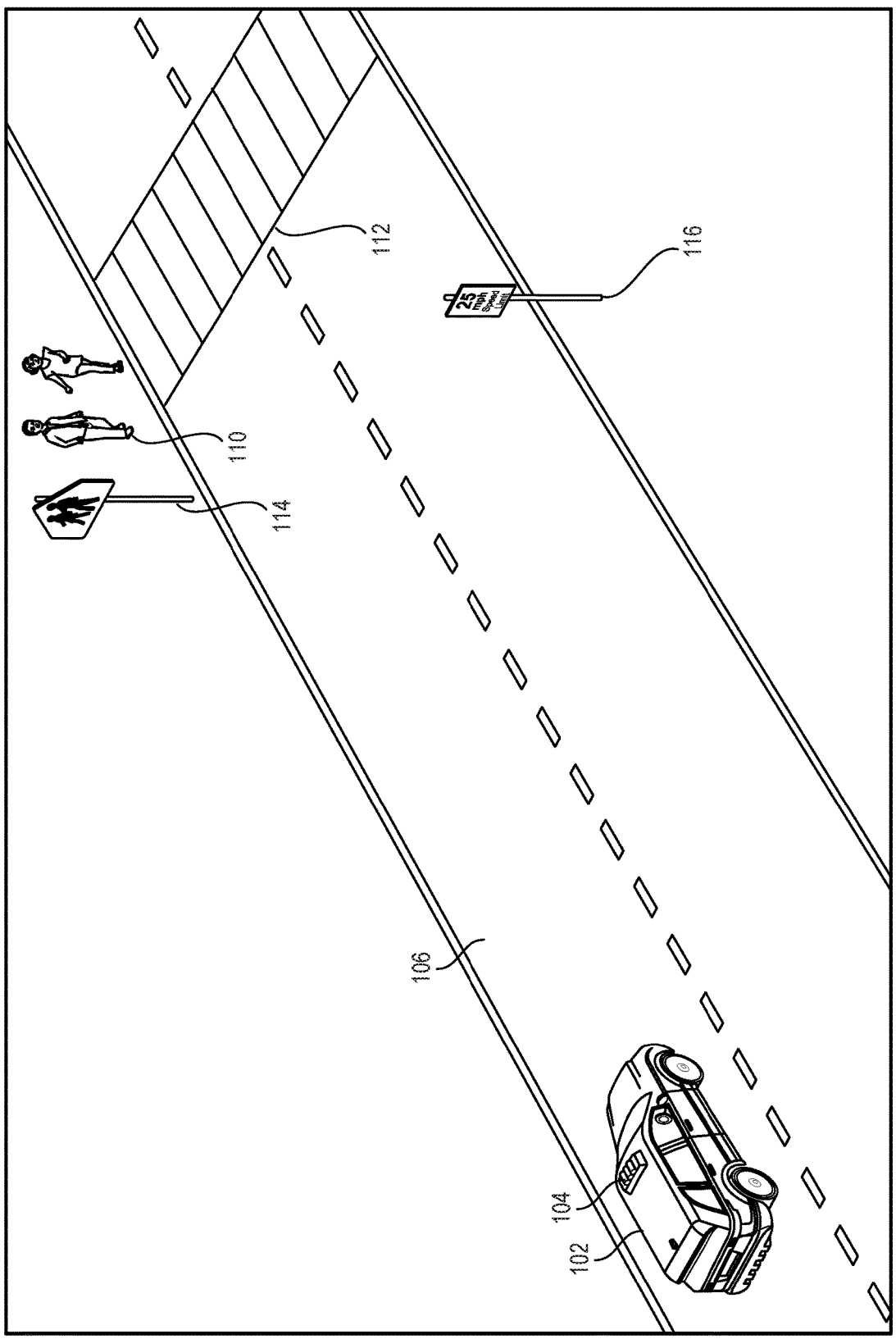
Figure 1C:
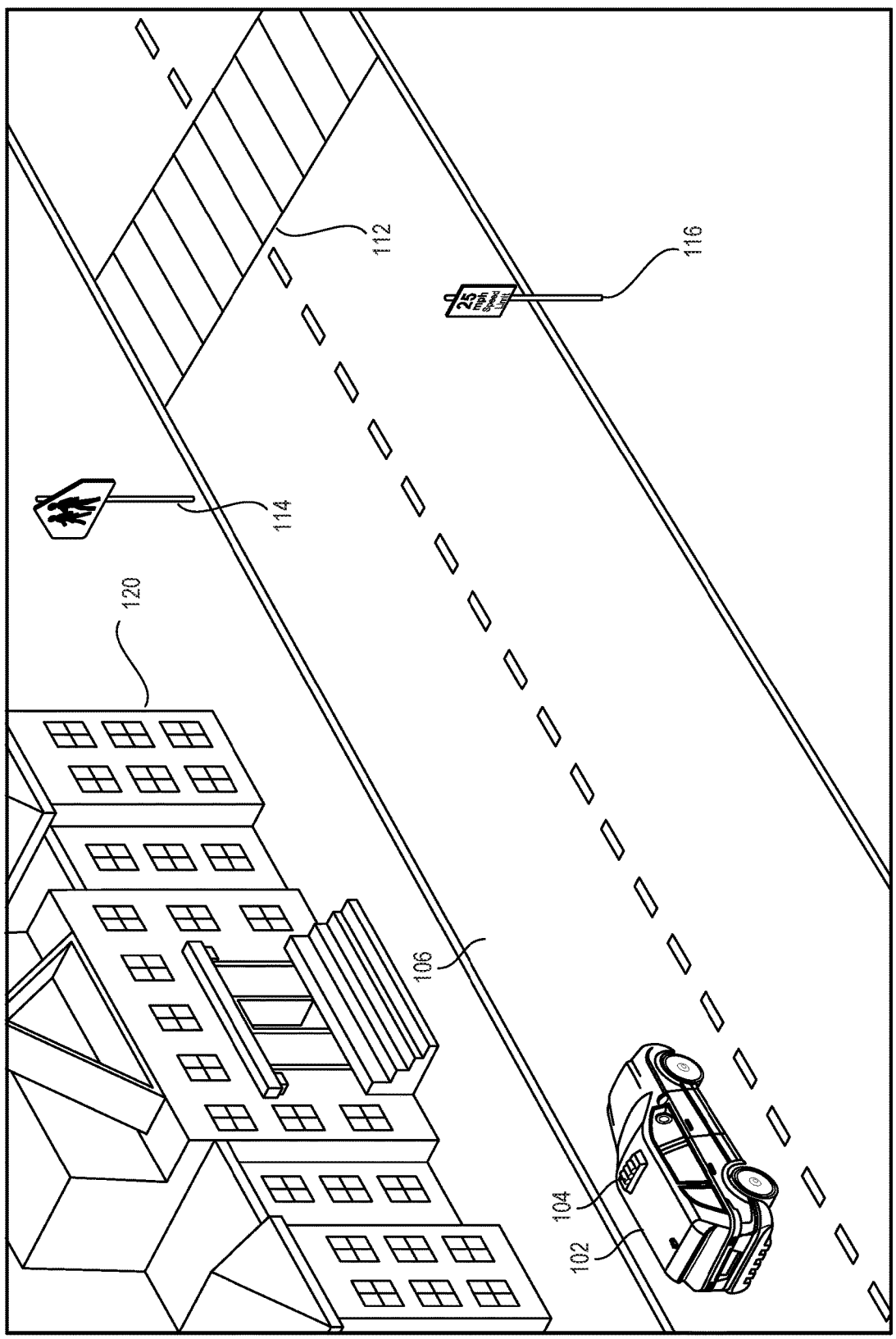

In the context of autonomous, semi-autonomous, and manually-driven vehicles, it is important to have accurate information pertaining to vehicle operation, such as a vehicle's position within its environment. FIGS. 1A-C illustrate an example scenario that is illustrative of various challenges that may be experienced using conventional approaches. In FIG. 1A, a vehicle 102 includes a sensor suite 104 and is driving down a road segment 106. The vehicle 102 may be an autonomous, semi-autonomous, or manually-driven vehicle. An accurate determination of a vehicle's position within its environment and relative to other objects in the environment is extremely important, as a computing system on the vehicle may make numerous driving decisions which are dependent on the vehicle's position. For example, in order to successfully navigate the road segment 106, the vehicle must know its position relative to lane markings. If the vehicle 102 does not have accurate information relating to the vehicle 102's position within its environment, decisions made by the vehicle computing system may be premised on incorrect assumptions, and could result in suboptimal vehicle operation and potentially pose safety hazards. For example, the vehicle 102 is depicted as being in the left lane of a two-lane, one way road. However, if the vehicle 102 incorrectly assumes that it is in the right lane, the vehicle 102 may attempt a lane change to the left, which could result in the vehicle 102 driving off the road.

Under conventional approaches, a vehicle's position within its environment can be determined using simultaneous localization and mapping (SLAM) techniques. However, conventional SLAM techniques pose disadvantages. For example, SLAM techniques typically rely on very detailed maps. In order to generate such detail-rich maps, individual roads must be traveled numerous times, and copious data must be collected and stored for each individual road segment. Such maps must also be updated frequently, as roads and nearby objects may change frequently, and any discrepancies may result in sub-optimal results using conventional SLAM techniques. For example, in FIG. 1A, the vehicle 102 is shown driving down a road segment 106 with two trees 108 to the left of the road. In FIG. 1B, the road segment 106 has been modified so that the road segment 106 now includes a crosswalk 112, a crosswalk sign 114, and a speed limit sign 116. Pedestrians 110 are also shown crossing the crosswalk 112. Furthermore, the trees 108 have been cut down and removed. Under conventional approaches, such changes to the road segment 106 would require an update to detailed map data pertaining to the road segment 106. In FIG. 1C, the road segment 106 and its surrounding environment has once again changed, as a new building 120 has been erected where the two trees 108 once stood. Once again, under conventional approaches, these changes would require yet another update to the detailed map data pertaining to the road segment 106. Changes to roads and nearby objects may happen very frequently. For example, during construction of the building 120, the visual surroundings of the road segment 106 may have changed daily, if not even more frequently. Each such change would require an update to a detailed map in order to ensure reliable performance using conventional SLAM techniques. Updated, detail-rich maps required for conventional SLAM techniques may not be available in many parts of the world. Furthermore, as autonomous or semi-autonomous vehicles become more widely utilized, the detail-rich maps that are required in conventional SLAM techniques may not be scalable. For example, it may be impractical to collect, maintain, and update such detailed information for every road in an entire state, an entire country, an entire continent, or the entire world. Conventional approaches thus pose disadvantages.

Furthermore, given the importance of accurately determining the position of an autonomous vehicle, redundancy in relation to position-determination techniques would support accurate estimation of vehicle position. Such redundancy could potentially involve position-determination techniques that would supplement conventional SLAM techniques to reliably estimate vehicle position. However, such redundancy generally is not available today.

An improved approach in accordance with the present technology overcomes the foregoing and other disadvantages associated with conventional approaches. In relation to the present technology, data collected by one or more sensors on a vehicle can be utilized to generate a position estimate for a vehicle within its environment. In certain embodiments, the vehicle position estimate can be generated within a map that is representative of the vehicle's environment. In general, sensor data from one or more sensors can be received to identify one or more objects and/or features within the vehicle's environment. Based on the identified objects and/or features, various inferences can be made about the vehicle's position within the environment (also referred to herein as positional inferences). For example, in certain embodiments, one or more road boundaries and/or lane markings can be identified using, for example, camera data, radar data, lidar data, and/or acoustic data. The positions of the road boundaries and lane markings can be used to make positional inferences about the position of the vehicle within its environment, and to estimate approximately which lane the vehicle is in. Similarly, in certain embodiments, sensor data can be used to identify one or more other vehicles in the vehicle's environment. The one or more other vehicles, and certain vehicle characteristics, such as their direction of travel, can be used to make various positional inferences about the position of the vehicle within its environment, and to estimate approximately which lane on a road the vehicle is in (e.g., a leftmost lane, a left center lane, a right center lane, a rightmost lane, etc.). Information from one or more sensors can be combined to generate a probabilistic map or a heat map indicating the likely position of the vehicle in a known map, or the likelihood that the vehicle is located at particular positions within the known map. For example, the information from the one or more sensors can be provided to a machine learning model trained to generate a probabilistic map based on input data. Although various machine learning models will be discussed herein, it should be understood that any sensor fusion algorithm could be used, such as a Kalman filter or a particle filter. The probabilistic map and/or heat map can be any kind of probability distribution. For example, the probability distribution could be represented using a discretized two-dimensional grid with probabilities that the vehicle is at a particular discretized position, or the probability distribution could be represented using a mean and a covariance (e.g., output of a Kalman filter), or the probability distribution could be represented as a weighted sum of position hypotheses (e.g., output of a particle filter). Information from one or more sensors can be used to make one or more positional inferences about the position of a vehicle. The one or more positional inferences and/or the information from the one or more sensors can be used to estimate and/or determine the most likely location of the vehicle. This information can be combined with other location determination methods or can be used independently to ensure accurate localization of the vehicle. In various embodiments, the present technology may generate a position estimate for a vehicle without using conventional SLAM techniques. In various embodiments, the known map may be a simplified map compared to the more complex semantic maps used in conventional SLAM techniques, and may comprise only a subset of the information contained in semantic maps required for conventional SLAM techniques. For example, the simplified map may indicate how many lanes are in a particular road, and directions of travel in each lane, and may, in certain embodiments, indicate the positions of certain fixed structures relative to the road. By utilizing a simplified map, and relying more heavily on sensor inputs, less map data is required compared to conventional SLAM techniques, and the map data need not be updated as frequently as conventional SLAM techniques. More details relating to the present technology are provided below.

Figure 2:
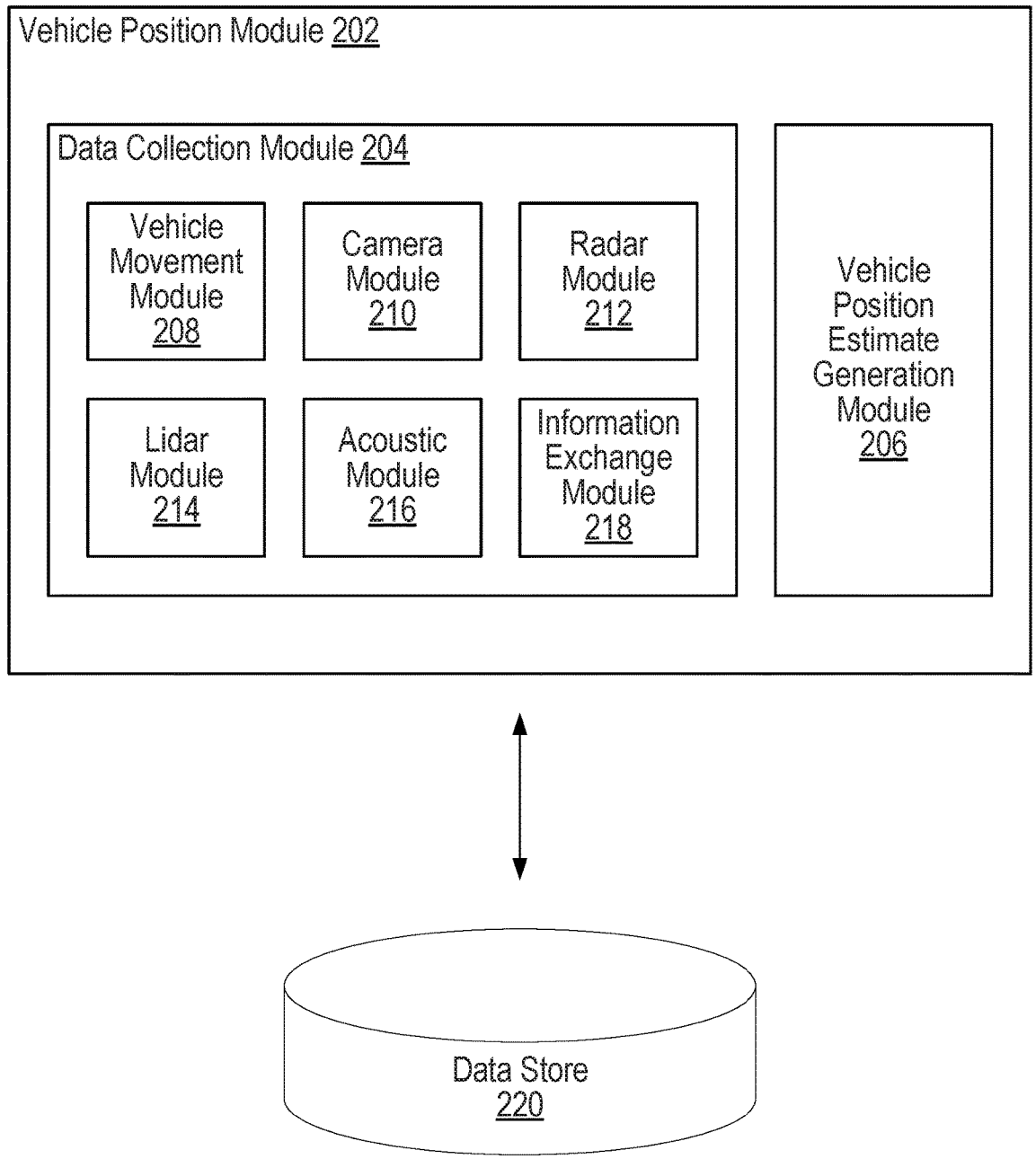
FIG. 2 illustrates an example position estimation module, according to an embodiment of the present technology.

FIG. 2 illustrates an example system 200 including an example vehicle position module 202, according to an embodiment of the present technology. As shown in the example of FIG. 2, the vehicle position module 202 can include a data collection module 204 and a vehicle position estimate generation module 206. In some instances, the example system 200 can include at least one data store 220. The components (e.g., modules, elements, etc.) shown in this figure and all figures herein are exemplary only, and other implementations may include additional, fewer, integrated, or different components. Some components may not be shown so as not to obscure relevant details. In some embodiments, some or all of the functionality performed by the vehicle position module 202 and its sub-modules may be performed by one or more backend computing systems, such as a transportation management system 660 of FIG. 6. In some embodiments, some or all of the functionality performed by the vehicle position module 202 and its sub-modules may be performed by one or more computing systems implemented in a vehicle, such as a vehicle 640 of FIG. 6.

The vehicle position module 202 can be configured to communicate and operate with the at least one data store 220, as shown in the example system 200. The at least one data store 220 can be configured to store and maintain various types of data. For example, the data store 220 can store known maps of various geographic regions, historical sensor data and position data, one or more trained machine learning models, and the like. In some embodiments, some or all data stored in the data store 220 can be stored by the transportation management system 660 of FIG. 6. In some embodiments, some or all data stored in the data store 220 can be stored by the vehicle 640 of FIG. 6. More details about information that can be stored in the data store 220 are provided below.

The data collection module 204 can be configured to receive data collected by one or more sensors or sensor systems on a vehicle. Data collected by sensors can be used to make various positional inferences about a vehicle's position within its environment. In certain embodiments, data collected by sensors can be compared with a known map representative of the vehicle's environment to determine the vehicle's position within the known map, as will be described in greater detail below. As can be seen in the example of FIG. 2, the data collection module 204 can include a vehicle movement module 208, a camera module 210, a radar module 212, a lidar module 214, an acoustic module 216, and an information exchange module 218. Each module may receive data from different sensors or sets of sensors, and various positional inferences can be made based on the sensor data received. Various examples of sensor data and example positional inferences will be described in greater detail herein.

The vehicle movement module 208 can be configured to receive vehicle movement data from one or more sensors on a vehicle pertaining to movement of the vehicle. For example, in certain embodiments, the vehicle movement module 208 can receive vehicle movement data from one or more inertial measurement units (IMUs). In certain embodiments, vehicle movement data can include vehicle steering angle information. In certain embodiments, vehicle movement data can include wheel odometry sensor data indicative of a rate of rotation of the vehicle's wheels, which can be used to infer a speed and/or velocity of the vehicle. The vehicle movement module 208 can utilize the vehicle movement data to determine and track relative motion of the vehicle over time. For example, the vehicle movement module 208 may determine and track an estimated trajectory of the vehicle over time. In certain embodiments, vehicle movement information indicative of a path or trajectory of a vehicle can be used to make certain positional inferences pertaining to the position of the vehicle. For example, vehicle movement information can be used to implement a temporal constraint on vehicle position estimates. For example, vehicle movement information can be used to dismiss or down-weight vehicle position estimates that are inconsistent with the vehicle's predicted movement. In a more particular example, if a vehicle is predicted to be in a first position at a first time, vehicle movement information can be used to prevent a subsequent vehicle position estimate that would place the vehicle unreasonably far away at a second time (e.g., two hundred miles away from the first position estimate if it is predicted that the vehicle has moved only one mile in that time). Stated differently, vehicle movement information can be used to determine a positional inference pertaining to distance traveled by the vehicle (i.e., determine an inferred distance traveled), and a subsequent vehicle position estimate may be constrained by the positional inference (e.g., the subsequent vehicle position estimate cannot exceed or otherwise differ from the inferred distance traveled by more than a threshold value).

The camera module 210 can be configured to receive camera data from one or more cameras on a vehicle. Camera data can be used to identify various objects or features in a vehicle's environment, and such objects or features can be used to make various positional inferences pertaining to the vehicle's position within the environment. In certain embodiments, a position and/or size of an object depicted in an image captured by a camera on a vehicle can be used to determine the vehicle's position relative to the object. For example, if a camera is mounted on a center of a vehicle and is pointed in a forward direction, any objects depicted in a left half of a captured image can be understood to be somewhere to the left of the vehicle, any objects depicted in a right half of a captured image can be understood to be somewhere to the right of the vehicle, and all objects captured in the image can be understood to be generally in front of the vehicle. Similarly, if an object is a first size in a first image, and the same object is larger in a subsequent image, it can be understood that the object is likely moving closer to the vehicle and/or the vehicle is moving closer to the object. In another example, if the dimensions of a particular object are known (e.g., dimensions of a stop sign), and the object is detected in a captured image, the distance of the object from the vehicle can be determined at least in part based on the size and/or position of the object in the captured image. Various positional inferences can be made based on the relative position of identified objects relative to the vehicle, various examples of which will be described in greater detail herein. Many variations are possible.

In an embodiment, data captured by a camera (e.g., image data, video data) can be analyzed to identify road features such as lane markings around the vehicle. In certain embodiments, the camera module 210 can be configured to determine the nature of a lane marking based on position, color (e.g., white v. yellow), type of line (e.g., solid v. dashed, single v. double), size (e.g., a thickness of a lane marking), and the like. The lane markings can be used to make positional inferences about the vehicle's relative position on a particular road. For example, if a vehicle is traveling on a particular portion of a road, and a known map of the portion of the road is available, the known map of the portion of the road may indicate that there are four lanes on the road, with two lanes moving in a first direction and two lanes moving in a second, opposite direction. If camera data indicates that there are two lanes to the left of the vehicle, the positional inference can be made that the vehicle is in one of the two right-most lanes. Furthermore, if camera data indicates that there is also one lane to the right of the vehicle, a positional inference can be made that the vehicle is likely in a center-right lane. Alternatively, if camera data indicates that there are three lanes to the left of the vehicle, and no lanes to the right of the vehicle, a positional inference can be made that the vehicle is likely in a right-most lane. Similarly, lane markings can be used not only to inform a transverse or lateral (left-to-right) position of a vehicle on a road, but also a longitudinal (forward-to-back) position of the vehicle. For example, camera data can be used to identify a stop line, or a cross-walk on a road. The position and size of the stop line or cross-walk in a captured image can be used to make positional inferences about the vehicle's position relative to the stop line or cross-line, which can be used to determine the vehicle's likely longitudinal position on a road. For example, if the position of the stop line or the cross-walk is indicated in a known map of the road being traveled by the vehicle, the vehicle's position within the known map can be estimated based on the vehicle's position relative to the stop line or the cross-walk. Likewise, other camera data can be used to identify other objects and/or features to make one or more positional inferences that can inform a determination of a vehicle's likely transverse position on a road. Accordingly, certain sensor data, such as camera data, can be used to determine a vehicle's estimated longitudinal position on a road, while certain sensor data can be used to determine a vehicle's estimated transverse position on a road.

In various embodiments, an image captured by a camera can be analyzed to identify other objects in a vehicle's environment. In one example, one or more other vehicles in a vehicle's environment can be identified and analyzed. For example, if camera data indicates that a vehicle has two vehicles in different lanes to its left, an inference can be made that there are at least two lanes to the left of the vehicle. Similarly, camera data can be analyzed to determine the direction of travel of the two vehicles. For example, if known map information indicates that the vehicle is traveling on a four lane road, with two lanes moving in each direction, and one of the two vehicles to the vehicle's left is moving in a direction opposite the vehicle, and the other of the two vehicles is moving in the same direction as the vehicle, a positional inference can be made that the vehicle is likely in a right-most lane. Conversely, if the two vehicles to the vehicle's left are both moving in a direction opposite the vehicle, a positional inference can be made that the vehicle is likely in a right-center lane.

In another example, camera data can be analyzed to identify other types of objects in a vehicle's environment. For example, the camera module 210 can be configured to identify in an image known, fixed structures. The fixed structures identified in an image may also be included in a known map representative of a vehicle's environment. These can include, for example, traffic signals, traffic signs, buildings, bridges, or other structures. By identifying these structures in an image captured from a vehicle, various positional inferences can be made regarding the vehicle's position relative to the structures. The positional inferences can be translated into an estimated position of the vehicle within the known map. For example, if an image captured by a camera on a vehicle indicates that the vehicle is stopped right in front of a stop sign, and the position of the stop sign is known in the known map, then the vehicle's likely position within the known map can be determined and/or informed based on the vehicle's proximity to the stop sign.

In various embodiments, the camera module 210 can be configured to utilize one or more machine learning models for automated identification of objects and object characteristics of objects depicted in captured images. For example, machine learning models can be used to automatically identify lane markings, vehicles, street signs, and other structures, and various associated characteristics. The one or more machine learning models can be configured to identify objects based on camera data captured by one or more cameras and, in certain embodiments, can also be configured to output a confidence score indicative of a likelihood or confidence that a particular object is depicted in an image.

The radar module 212 can be configured to receive radar data from one or more radar systems on a vehicle. Similar to the camera data described above, radar data can be used to identify various objects or features in a vehicle's environment, and such objects or features can be used to generate positional inferences about the vehicle's position relative to the objects or features. The positional inferences can be used to inform a vehicle position estimate indicative of a vehicle's likely position within its environment. In certain embodiments, radar data can include the relative positions (e.g., angular positions and/or distances) of various objects in relation to a vehicle, as well as relative velocities of the various objects in relation to the vehicle. Much like the camera data described above, radar data can be analyzed to identify objects around the vehicle. For example, radar data can be used to determine that two vehicles to the left of the vehicle are moving in a direction opposite the vehicle, and one vehicle to the right of the vehicle is moving in the same direction as the vehicle. This information can be used to make the positional inference that the vehicle is most likely in a right-center lane.

In various embodiments, the radar module 212 can be configured to utilize one or more machine learning models for automated identification of objects and object characteristics based on radar data. For example, machine learning models can be used to automatically identify vehicles, street signs, and other structures based on radar data. The machine learning models can also be used to determine object characteristics for identified objects, such as the direction of travel of a vehicle. The one or more machine learning models can be configured to identify objects based on radar data captured by one or more radar systems and, in certain embodiments, can also be configured to output a confidence score indicative of a likelihood or confidence that a particular object is actually what it is predicted to be.

The lidar module 214 can be configured to receive lidar data from one or more lidar systems on a vehicle. Similar to the camera data and radar data described above, lidar data can be used to identify various objects or features in a vehicle's environment, and such objects or features can be used to generate positional inferences about the vehicle's position relative to the objects or features. The positional inferences can be used to inform a vehicle position estimate indicative of a vehicle's likely position within its environment. In certain embodiments, lidar data can include the relative positions of various objects or features in relation to a vehicle. Lidar data is also capable of determining reflectivity characteristics of objects, which can be used to determine or estimate an object's color. This can be useful, for example, for identifying and distinguishing between different types of lane markings or traffic signs, and the like. Much like the camera data described above, lidar data can be analyzed to identify objects and/or features around the vehicle. For example, lidar data can be used to determine that two vehicles to the left of the vehicle are moving in a direction opposite the vehicle, and one vehicle to the right of the vehicle is moving in the same direction as the vehicle. This information can be used to make a positional inference that the vehicle is most likely in a right-center lane. In another example, lidar data can be used to determine that a traffic light is 30 feet in front of a vehicle, or a large building is 100 feet to the left of the vehicle, and the like. Such information can be compared to known objects depicted in a known map in order to generate a position estimate for the vehicle within the known map.

In various embodiments, the lidar module 214 can be configured to utilize one or more machine learning models for automated identification of objects and object characteristics based on lidar data. For example, machine learning models can be used to automatically identify lane markings, vehicles, street signs, and other structures based on lidar data. The one or more machine learning models can be configured to identify objects based on lidar data captured by one or more lidar systems and, in certain embodiments, can also be configured to output a confidence score indicative of a likelihood or confidence that a particular object is actually what it is predicted to be.

The acoustic module 216 can be configured to receive acoustic data from acoustic sensors (e.g., microphone) on a vehicle. Like the other types of data described above, acoustic data can be used to identify various objects or features in a vehicle's environment, and such objects or features can be used to make positional inferences about the vehicle's position relative to those objects or features. The positional inferences can be used to inform a vehicle position estimate indicative of a vehicle's likely position within its environment. For example, assume that a vehicle having acoustic sensors is traveling along a road with an upcoming crosswalk. If the road and the crosswalk are constructed from different materials (e.g., concrete versus brick), acoustic signals captured by the acoustic sensors will be different when the vehicle is on the road compared to when the vehicle is on the crosswalk. In this example, the acoustic signals generated by the vehicle will help to distinguish when the vehicle is approaching the crosswalk from the road, when the vehicle is traversing the crosswalk, and when the vehicle has resumed travel on the road. This information can be used to generate a position estimate for the vehicle within a known map that reflects the road, the crosswalk, and other objects associated with distinctive acoustic features.

In various embodiments, the acoustic module 216 can be configured to utilize one or more machine learning models for automated identification of objects and object characteristics based on acoustic data. For example, machine learning models can be used to automatically identify various road segments, road crossings constructed with various materials, speed bumps, raised pavement markers, etc. The one or more machine learning models can be configured to identify objects based on acoustic data captured by one or more acoustic sensors and, in certain embodiments, can also be configured to output a confidence score indicative of a likelihood or confidence that a particular object is actually what it is predicted to be.

The information exchange module 218 can be configured to exchange sensor data with one or more other vehicles and/or receive sensor data captured by other vehicles. In certain embodiments, vehicles may be configured to communicate with one another through a communication hub (e.g., the transportation management system 660) and/or via direct communications between vehicles. Vehicles can exchange sensor information to make additional positional inferences and further inform and improve their individual position estimates. Consider an example scenario in which a first vehicle is traveling in front of a second vehicle. A camera directed in front of the first vehicle may detect a stop sign and stop line coming up. However, the stop sign and stop line may not be visible to the second vehicle because the first vehicle is blocking the visibility of the stop sign and stop line. In such a scenario, the first vehicle can communicate with the second vehicle to notify the second vehicle that a stop sign and stop line are positioned approximately 100 feet in front of the first vehicle.

In certain embodiments, the information exchange module 218 can also be configured to determine relative position information for two vehicles communicating with one another. For example, low energy Bluetooth communications can be utilized to determine a general distance estimate for two vehicles relative to one another and/or a position estimate triangulated from multiple receives and transmitters associated with the vehicles. Further to the example discussed above, the second vehicle can determine that it is approximately 20 feet behind the first vehicle and thus also make a positional inference that the stop sign and stop light are approximately 120 feet in front of the second vehicle.

Figure 4:
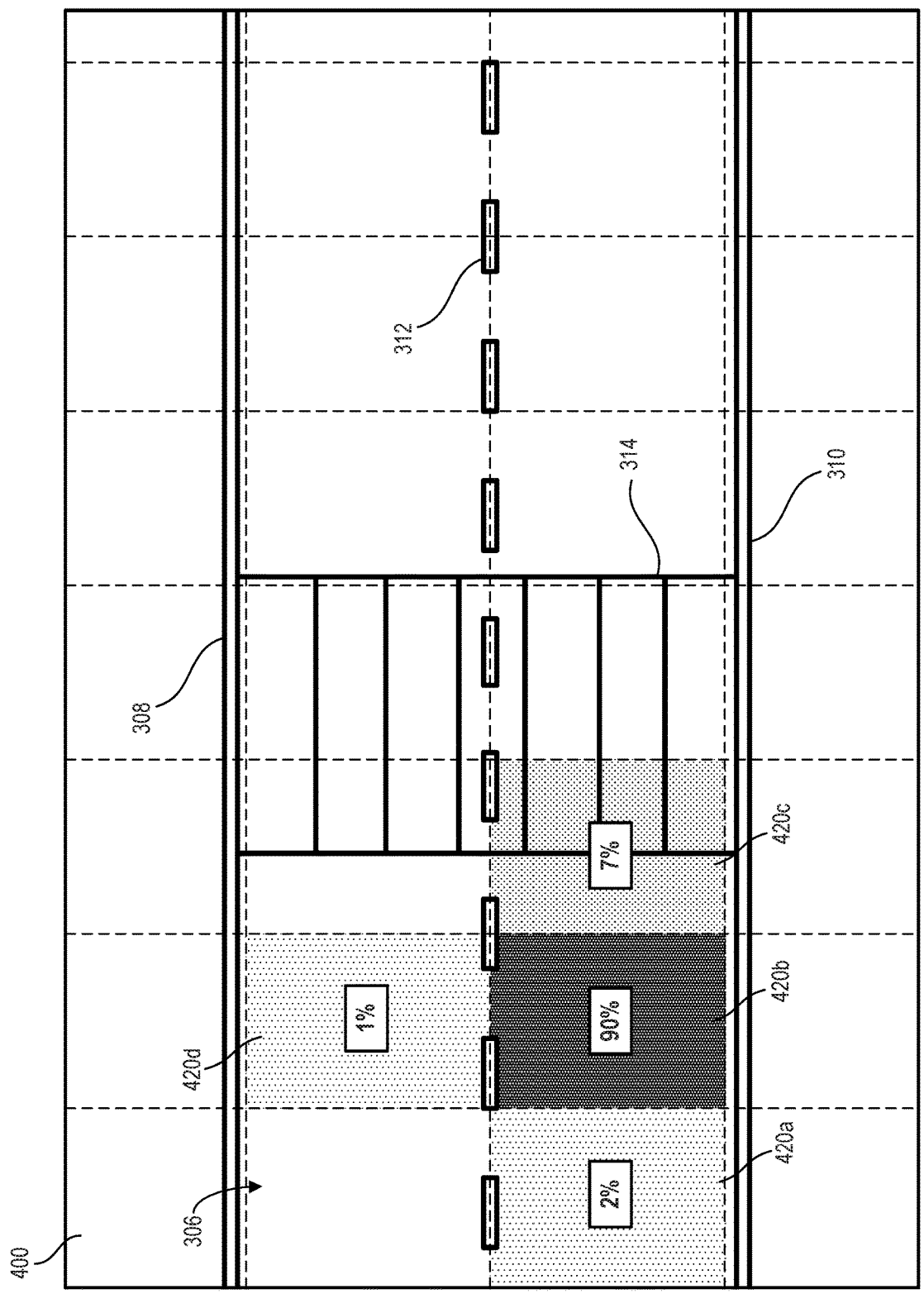
FIG. 4 illustrates an example probabilistic map estimation of a vehicle's position, according to various embodiments of the present technology.

The vehicle position estimate generation module 206 can be configured to generate a position estimate for a vehicle based on one or more positional inferences pertaining to the vehicle and/or sensor data received from one or more sensors. The one or more positional inferences pertaining to the vehicle may be generated based on the sensor data received from one or more sensors. The sensor data can include sensor data captured by one or more sensors on the vehicle, or additional sensor data captured by one or more sensors on other vehicles, some examples of which have been described above. The vehicle position estimate generation module 206 can be configured to combine sensor data from the various sensors to make one or more positional inferences pertaining to the vehicle, and generate a position estimate for the vehicle. In certain embodiments, the position estimate generated by the vehicle position estimate generation module 206 may take the form of a heat map or probabilistic map indicating, for one or more positions within a known map (e.g., a semantic road network map), a likelihood that the vehicle is positioned at each position. An example probabilistic map is depicted in FIG. 4, which will be described in greater detail herein. In various embodiments, the vehicle position estimate generation module 206 can be configured to identify a known map of a vehicle's environment based on vehicle location information. For example, GPS information can be used to determine a vehicle's general geographic position, and a known map for the vehicle's general geographic position can be acquired (e.g., from a digital storage medium or over a network). As discussed above, the vehicle's position within the known map can be estimated based on identification of objects or features around the vehicle. In an embodiment, the known map used by the vehicle position estimate generation module 206 may be a semantic road network map, and may be substantially more simple than the detail-heavy semantic maps used in conventional SLAM systems. For example, conventional SLAM systems typically utilize three-dimensional semantic maps which identify substantially all fixed objects in a geographic region. The simplified semantic road network map utilized by the vehicle position estimate generation module 206 may be, for example, a two-dimensional map which includes only a subset of fixed objects in a geographic region and/or a subset of fixed objects in a detailed semantic map used in a SLAM system. For example, the semantic road network map may contain the positions of roads in a region, the number of lanes in each road, a direction of travel for each lane, traffic sign information, lane marking information, and/or the general positions of fixed structures (e.g., buildings, bridges) in a geographic region. In various embodiments, a semantic road network map through which a vehicle can estimate vehicle position can include and exclude various types of information, as selectively determined by, for example, an administrator of the transportation management system 660 with which the vehicle communicates. In various embodiments, the present technology may generate a position estimate for a vehicle without using conventional SLAM techniques.

In certain embodiments, individual sets of sensor data provided by the data collection module 204 to the vehicle position estimate generation module 206 may be associated with confidence values. For example, if the camera module 210 identifies a stop sign proximate the vehicle, and a position of the stop sign relative to the vehicle, the camera module 210 can provide the vehicle position estimate generation module 206 with a set of sensor data indicating the presence of the stop sign and its estimated position relative to the vehicle. This set of sensor data can be associated with a confidence value indicative of a likelihood that the identified stop sign is actually a stop sign. Similarly, if the lidar module 214 identifies a cross-walk proximate the vehicle, and a relative position of the cross-walk with respect to the vehicle, the lidar module 214 can provide a set of sensor data to the data collection module 204 indicating the presence and position of the cross-walk, and a confidence value for that set of data. In certain instances, different sensors may identify the same objects. In such instances, confirmation of information from the different sensors may work to improve the confidence values associated with such information. In an embodiment, confidence values associated with data can be used to weight the data as the vehicle position estimate generation module 206 generates a vehicle position estimate. For example, if the camera module 210 determines with 80% certainty that a particular object is a stop sign, and the lidar module 214 determines with 10% certainty that the same object is a speed-limit sign, the determination by the lidar module 214 may be ignored or otherwise de-emphasized. Conversely, if the camera module 210 determines with 80% certainty that the particular object is a stop sign, and the lidar module 214 also determines with 10% certainty that the object is a stop sign, then the vehicle position estimate generation module 206 can improve the confidence of the object identification based on the concurring determinations made by the camera module 210 and the lidar module 214.

In certain embodiments, weighted sets of sensor data can be combined to generate a vehicle position estimate based on statistical approaches, such as weighted non-linear least squares. In other embodiments, sets of sensor data and their associated weights or confidence values can be provided to a machine learning model that is trained to generate a vehicle position estimate. In certain embodiments, the machine learning model can be trained using historical sets of sensor data and a ground truth indicating a known position of the vehicle within an environment (e.g., within a map representative of the environment). In certain embodiments, the ground truth position of a vehicle used in training a machine learning model may be determined based on a SLAM system implemented on the vehicle.

Figure 3:
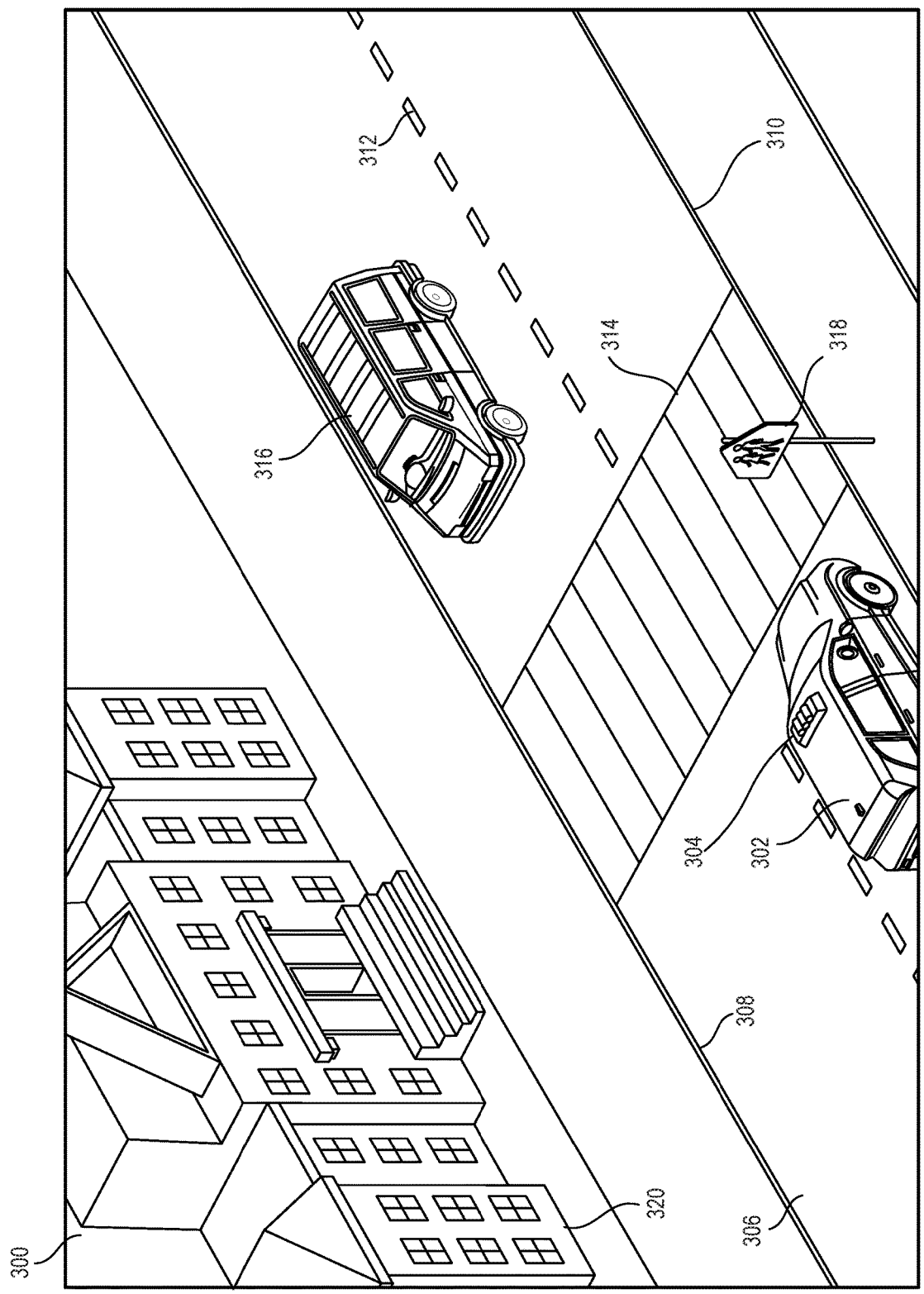
FIG. 3 illustrates an example scenario, according to an embodiment of the present technology.

FIG. 3 illustrates an example scenario 300 to illustrate the present technology. FIG. 3 depicts an example scenario 300 in which a vehicle 302 has a sensor suite 304 comprising one or more sensors. As the vehicle 302 travels down a road 306, the surroundings of the vehicle 302 include lane markings 308, 310, 312, a cross-walk 314, another moving vehicle 316, a cross-walk sign 318, and a building 320. The vehicle 302 can utilize sensor data from the one or more sensors in the sensor suite 304 to identify the various objects, features, and characteristics of those objects and/or features. For example, camera data and/or lidar data can be used to identify road features such as lane markings 308, 310, 312, and to determine that there is one lane to the left of the vehicle. This information can be used to make the positional inference that the vehicle 302 is not in a left-most lane of the road 306. This positional inference, combined with known map information (e.g., semantic road network map information) indicating that the vehicle is traveling on a two-lane road, can be used to determine that the vehicle is likely in a right lane of the two-lane road. Similarly, camera, radar, and/or lidar information can be used to identify objects, such as the vehicle 316, and to determine that the vehicle 316 is to the left of the vehicle 302, and traveling in the opposite direction of the vehicle 302. Once again, this information can be used to make the positional inference that the vehicle 302 is not in a left-most lane of the road 306 and/or that the vehicle 302 is likely in the right lane of the two-lane road 306. Camera, radar, and/or lidar information can also be used to identify other road features, such as the cross-walk 314, and/or other objects, such as the cross-walk sign 318, and to determine that the vehicle 302 is approaching the cross-walk 314 and the cross-walk sign 318. This information can provide an indication of the vehicle's longitudinal position along the road 306.

FIG. 4 illustrates an example probabilistic map 400 generated based on the example scenario 300 of FIG. 3. The example probabilistic map 400 includes a known map of the environment of the vehicle 302. The known map, for example, indicates that the vehicle 302 is traveling on a two lane road 306, and that there is a crosswalk crossing the road. In the probabilistic map 400, the known map is overlaid with probabilities indicative of a likelihood that the vehicle 302 is positioned at various locations within the known map. As discussed above, identification of the various lane markings and other objects in the environment of the vehicle 302, such as the other vehicle 316, can be used to determine that the vehicle 302 is likely in a right lane of the road 306. Similarly, identification of the cross-walk 314, and its proximity to the vehicle 302, can be used to determine that the cross-walk 314 is near the front of the vehicle 302. Based on these determinations, the probabilistic map 400 indicates that there is a 90% likelihood that the vehicle 302 is positioned in a first region 420b, a 7% likelihood that the vehicle is positioned in a second region 420c, a 2% likelihood that the vehicle is positioned in a third region 420a, and a 1% likelihood that the vehicle is positioned at a fourth region 420d. All other regions in the probabilistic map 400 are determined to have a 0% likelihood that the vehicle 302 is located within those regions. The example probabilistic map 400 has been depicted as having a fairly low level of granularity for ease of demonstration, but it should be understood that a probabilistic map could have varying levels of granularity.

Figure 5:
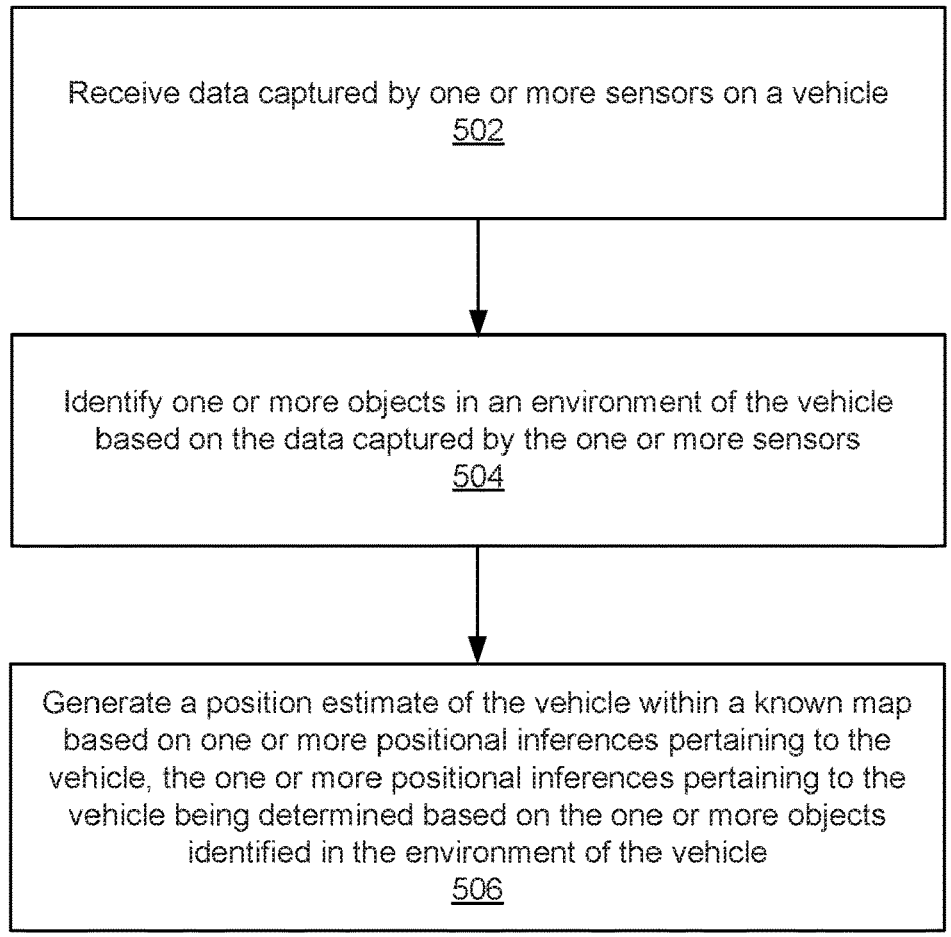
FIG. 5 illustrates an example method, according to an embodiment of the present technology.

FIG. 5 illustrates an example method 500, according to an embodiment of the present technology. At block 502, the example method 500 can receive data captured by one or more sensors on a vehicle. At block 504, the example method 500 can identify one or more objects or features in an environment of the vehicle based on the data captured by the one or more sensors. At block 506, the example method 500 can generate a position estimate of the vehicle within a known map based one or more positional inferences pertaining to the vehicle, the one or more positional inferences pertaining to the vehicle being determined based on the one or more objects or features identified in the environment of the vehicle.

Many variations to the example method are possible. It should be appreciated that there can be additional, fewer, or alternative steps performed in similar or alternative orders, or in parallel, within the scope of the various embodiments discussed herein unless otherwise stated.

Figure 6:
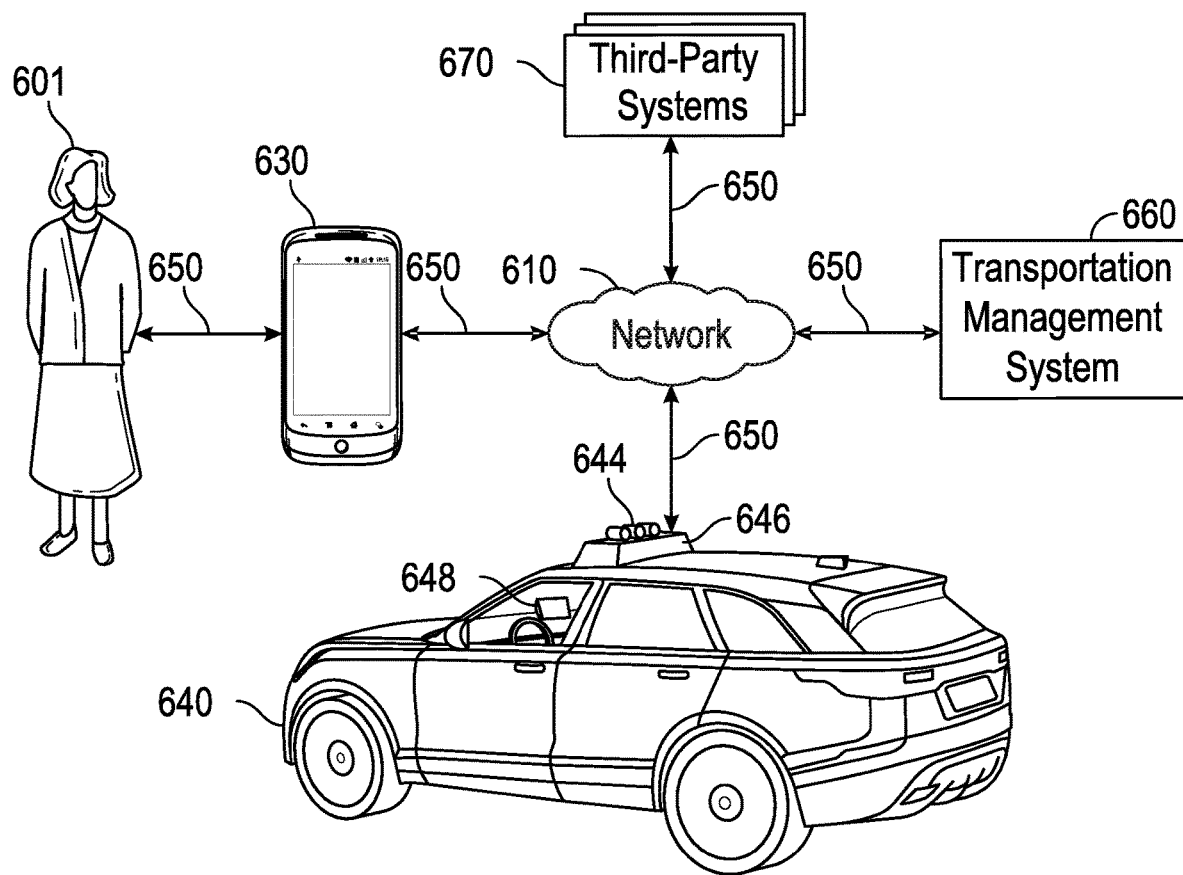
FIG. 6 illustrates an example block diagram of a transportation management environment, according to an embodiment of the present technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the vehicle position module 202 may be implemented by one or more computing systems of the transportation management system 660. In some embodiments, some or all modules of the vehicle position module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when traveling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
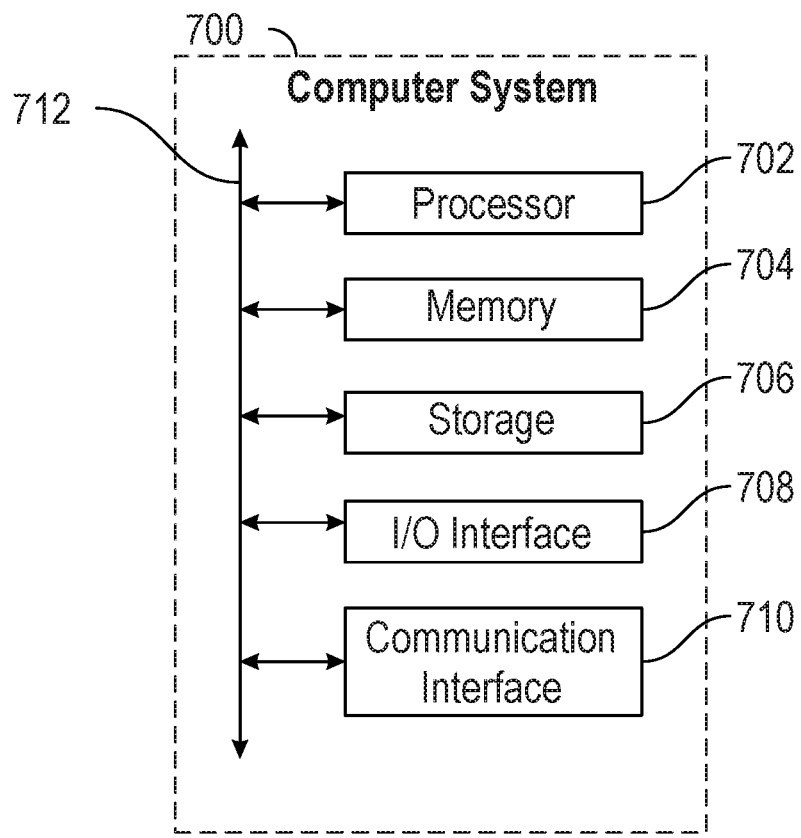
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
    receiving, by a computing system, data captured by one or more sensors associated with a vehicle;
    identifying, by the computing system, one or more objects or features in an environment external to the vehicle based on the data captured by the one or more sensors;
    generating, by the computing system, one or more positional inferences between a relative position of the vehicle and one or more positions of the one or more objects or features identified in the environment external to the vehicle; and
    generating, by the computing system, a position estimate for the vehicle within a known map that contains the one or more positions of the one or more objects or features associated with the one or more positional inferences, wherein the known map is a simplified map comprising a subset of information contained in a complex semantic map utilized by a SLAM technique.

2. The computer-implemented method of claim 1, wherein the generating the position estimate for the vehicle within the known map comprises
    identifying a plurality of lanes based on the known map, and
    determining that the vehicle may be positioned within a first lane of the plurality of lanes based on the one or more objects or features identified in the environment external to the vehicle.

3. The computer-implemented method of claim 2, wherein the one or more objects or features identified in the environment external to the vehicle comprise one or more additional vehicles.

4. The computer-implemented method of claim 3, wherein the identifying one or more objects or features in the environment external to the vehicle further comprises determining, for each vehicle of the one or more additional vehicles, a direction of travel for the vehicle based on the data captured by the one or more sensors.

5. The computer-implemented method of claim 4, wherein the first lane of the plurality of lanes is identified based on the one or more additional vehicles and the directions of travel for the one or more additional vehicles.

6. The computer-implemented method of claim 2, wherein the one or more objects or features identified in the environment external to the vehicle comprise one or more lane markings, and
   the first lane of the plurality of lanes is identified based on the one or more lane markings.

7. The computer-implemented method of claim 1, wherein the generating the position estimate for the vehicle within the known map comprises:
   generating a probabilistic map, wherein the probabilistic map comprises a plurality of positions within the known map and, for each position of the plurality of positions, a likelihood value indicative of a likelihood that the vehicle is positioned at that position in the known map.

8. The computer-implemented method of claim 1, wherein the generating the position estimate for the vehicle within the known map comprises:
   generating a transverse positional estimate for the vehicle based on a first subset of the data captured by the one or more sensors on the vehicle, and
   generating a longitudinal positional estimate for the vehicle based on a second subset of the data captured by the one or more sensors on the vehicle.

9. The computer-implemented method of claim 1, wherein
   the known map is based on a semantic road network map.

10. The computer-implemented method of claim 1, further comprising:
    receiving additional sensor data captured by one or more additional vehicles, wherein the generating the position estimate for the vehicle within the known map is performed further based on the additional sensor data.

11. A system comprising:
    at least one processor; and
    a memory storing instructions that, when executed by the at least one processor, cause the system to perform:
       receiving data captured by one or more sensors associated with a vehicle;
       identifying one or more objects or features in an environment external to the vehicle based on the data captured by the one or more sensors;
       generating one or more positional inferences between a relative position of the vehicle and one or more positions of the one or more objects or features identified in the environment external to the vehicle; and
       generating a position estimate for the vehicle within a known map that contains the one or more positions of the one or more objects or features associated with the one or more positional inferences, wherein the known map is a simplified map comprising a subset of information contained in a complex semantic map utilized by a SLAM technique.

12. The system of claim 11, wherein the generating the position estimate for the vehicle within the known map comprises
    identifying a plurality of lanes based on the known map, and
    determining that the vehicle may be positioned within a first lane of the plurality of lanes based on the one or more objects or features identified in the environment external to the vehicle.

13. The system of claim 12, wherein the one or more objects or features identified in the environment external to the vehicle comprise one or more additional vehicles.

14. The system of claim 13, wherein the identifying one or more objects or features in the environment external to the vehicle further comprises determining, for each vehicle of the one or more additional vehicles, a direction of travel for the vehicle based on the data captured by the one or more sensors.

15. The system of claim 14, wherein the first lane of the plurality of lanes is identified based on the one or more additional vehicles and the directions of travel for the one or more additional vehicles.

16. A non-transitory computer-readable storage medium including instructions that, when executed by at least one processor of a computing system, cause the computing system to perform:
    receiving data captured by one or more sensors associated with a vehicle;
    identifying one or more objects or features in an environment external to the vehicle based on the data captured by the one or more sensors;
    generating one or more positional inferences between a relative position of the vehicle and one or more positions of the one or more objects or features identified in the environment external to the vehicle; and
    generating a position estimate for the vehicle within a known map that contains the one or more positions of the one or more objects or features associated with the one or more positional inferences, wherein the known map is a simplified map comprising a subset of information contained in a complex semantic map utilized by a SLAM technique.

17. The non-transitory computer-readable storage medium of claim 16, wherein the generating the position estimate for the vehicle within the known map comprises
    identifying a plurality of lanes based on the known map, and
    determining that the vehicle may be positioned within a first lane of the plurality of lanes based on the one or more objects or features identified in the environment external to the vehicle.

18. The non-transitory computer-readable storage medium of claim 17, wherein the one or more objects or features identified in the environment external to the vehicle comprise one or more additional vehicles.

19. The non-transitory computer-readable storage medium of claim 18, wherein the identifying one or more objects or features in the environment external to the vehicle further comprises determining, for each vehicle of the one or more additional vehicles, a direction of travel for the vehicle based on the data captured by the one or more sensors.

20. The non-transitory computer-readable storage medium of claim 19, wherein the first lane of the plurality of lanes is identified based on the one or more additional vehicles and the directions of travel for the one or more additional vehicles.

* * * * *